UNITED STATES PATENT OFFICE.

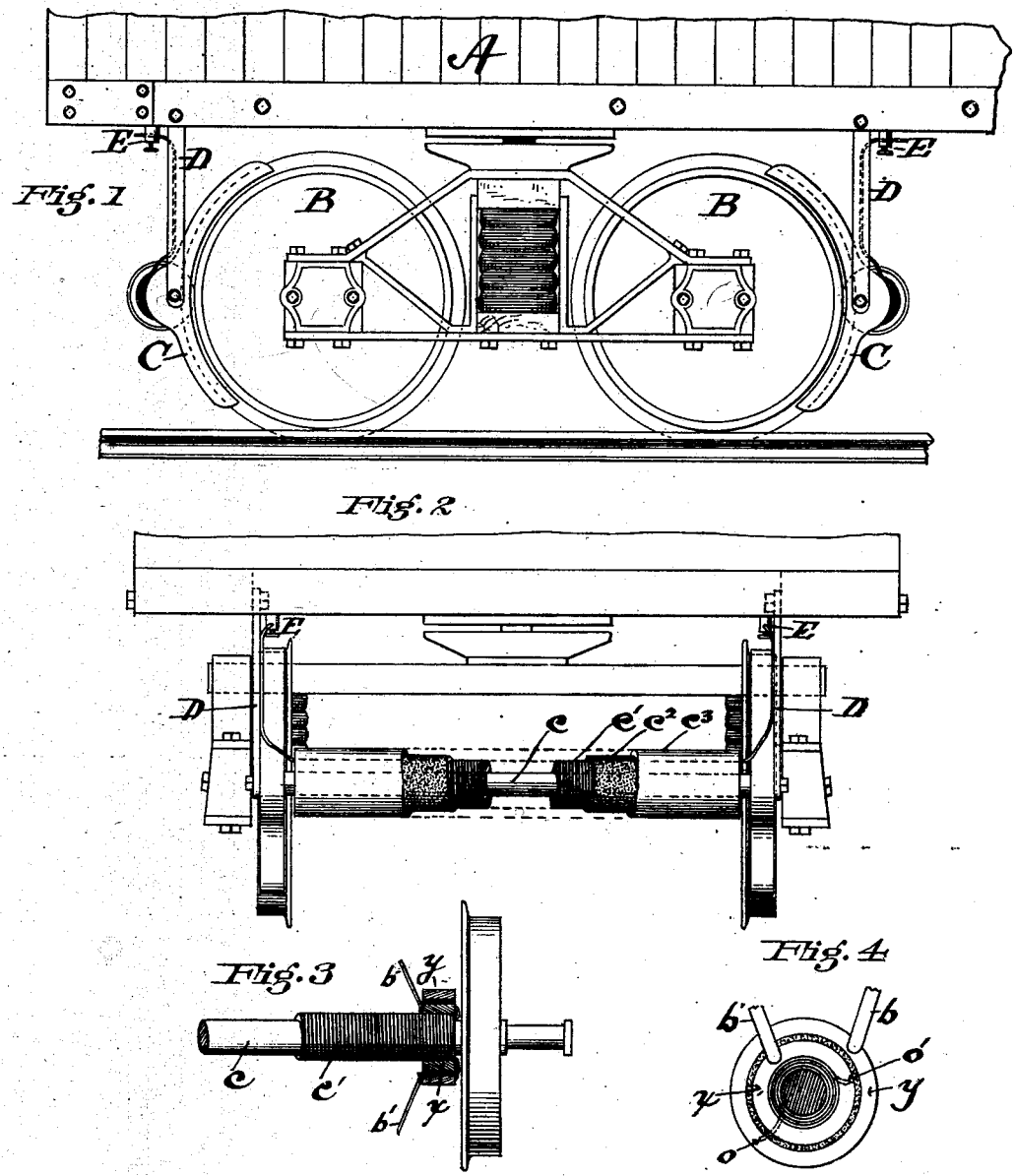

HUGO WALTER, AUGUSTUS L. DUWELIUS, AND FRANK R. MERRELL, OF CINCINNATI, OHIO.

ELECTRO-MAGNETIC BRAKE.

SPECIFICATION forming part of Letters Patent No. 237,071, dated January 25, 1881.

Application filed November 9, 1880. (No model.)

*To all whom it may concern:*

Be it known that we, HUGO WALTER, AUGUSTUS L. DUWELIUS, and FRANK R. MERRELL, citizens of the United States, residing at Cincinnati, Ohio, have invented new and useful Improvements in Electro - Magnetic Brakes, of which the following is a specification.

Our invention relates to that class of electro-magnetic car-brakes in which a direct magnetic attraction is caused between the car-wheel and the brake-shoe, and its object is to secure a powerful action of the attracting or inducing part.

It is well known that the power of electro-magnets increases very rapidly within certain limits, as the length of their coils is increased, and that increase in the diameter of the coils beyond a very short radius adds little or nothing to the polarizing effect. With a view to providing a comparatively long helix and core for polarizing the friction-surfaces of an electro-magnetic car-brake mechanism, we use as a core the transverse connecting-bar which extends from side to side of the car and connects the bodies upon which such surfaces are formed. We thus provide a core for a long polarizing helix.

Our invention is embodied in the mechanism illustrated in the accompanying drawings, in which—

Figure 1 is a side elevation of the truck of a railway-car to which our invention is applied. Fig. 2 is an end view of the same. Fig. 3 is an elevation of a portion of an axle and wheel, showing the attachment for applying the electro-magnetic force to the wheel; and Fig. 4 is a cross-section of the axle, showing the coil, insulating and conducting collars, and switch-springs.

Similar letters indicate similar parts in drawings and specification.

In the drawings, A represents the car to which our invention is applied; B B, the wheels, and C C the brakes. The parts are of the ordinary construction, excepting the brake, which consists, substantially, of brake-shoes and connecting - bar of wrought - iron, preferably forged together of one piece, the whole being suspended by links D from the car in the usual manner, so as to remain normally out of contact but close to the periphery or face of the wheels.

The connecting-bar $c$ of the brake is wound with insulated wire $c'$, covered by suitable protecting and insulating coats $c^2$ $c^3$, of gutta-percha or other material, the two ends of the wire being carried up beside the suspending-links D, for protection to binding-posts E upon the body of the car or track where the battery connections are made, communicating with a cell-battery, pile, or generator of electricity, either on the car or upon the engine of a train. The latter arrangement is preferable, under ordinary circumstances, for railway use, as the brakes may thus be brought under control of the engineer. In this case the transmitting-wires may be arranged beneath or above the cars, in sections connected by short connecting-pieces, and the circuit closed at the will of the engineer by switch with or without regulating devices. The circuit is ordinarily left open, but it is apparent that when closed the brake is constituted an electro-magnet and an attractive force developed between the wheels and brake with a strength proportionate to that of the battery-current, which may be governed by a suitable regulator. The same substantial result may be produced by applying the electric current to the wheels of the car through the medium of the axle, as shown in Fig. 3.

The arrangement and construction is substantially as follows: The ends of the coil $c'$ on the axle $c$, Fig. 3, are electrically connected with two insulated collars, $x$ $y$, at $o$ $o'$, suitably secured upon the axle or upon the coil with insulating-bands between them and adjacent parts. The collars $x$ $y$ may form parts of a compound collar attached at one point of the axle or to the wheel, or the collars may be attached at different points of the axle or to opposite wheels. In either case they revolve with the wheels. The electrical connections are made by contact of two switch-bars, $b$ $b'$, so mounted upon the body of the car or truck as to preserve their relative stationary position, but accommodate the action of the car-springs. These switch-bars are preferably of spring-brass, and rest against or upon the collars with sufficient force to insure a perfect electrical contact at all times during the revolution of the wheels. To these the battery-wires are connected in the ordinary manner.

Having described our invention, we claim and desire to secure by Letters Patent—

1. The combination, in an electro-magnetic car-brake mechanism, of two iron wheels under opposite sides of a car, two iron brake-shoes arranged for application to said wheels, an iron connecting-bar surrounded by an insulated helix and having its ends connected with two of the similar friction-surfaces of the brake mechanism at opposite sides of the car, and suitable means for connecting said helix in an electric circuit, whereby said surfaces may be simultaneously polarized and act upon the adjacent surfaces, and the connecting-bar utilized for forming the core of an electro-magnet having great length in proportion to its diameter, essentially as set forth.

2. The combination, with a pair of iron wheels of a car, of a connecting iron axle surrounded by an insulated helix, two insulated metallic collars surrounding said axle and connected to opposite terminals of said helix, respectively, metallic arms resting upon said collars, respectively, and secured to the framework of the car, and brake-shoes arranged for application to and movable toward the wheels by the attraction of the same when magnetized by the passage of an electric current over the helix, essentially as set forth.

In testimony whereof we have hereunto set our hands in the presence of two subscribing witnesses.

HUGO WALTER.
AUGUSTUS L. DUWELIUS.
FRANK R. MERRELL.

Witnesses:
L. M. HOSEA,
C. P. DOOLITTLE.